Figure 1:
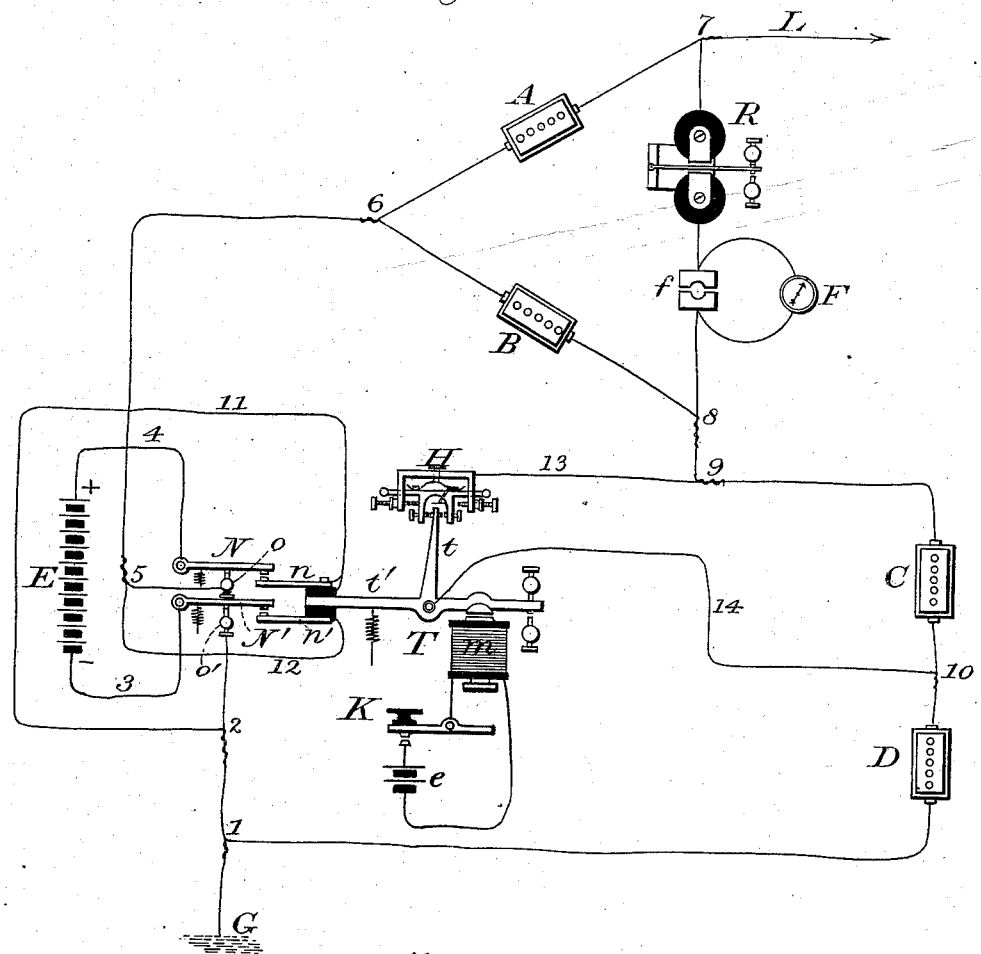

(No Model.)

G. d'INFREVILLE.
Duplex Telegraph.

No. 238,094.                Patented Feb. 22, 1881.

Witnesses:
Miller Earl
Chas A Terry

Inventor,
Georges d'Infreville,
by his Attorney,
Frank L. Pope

UNITED STATES PATENT OFFICE.

GEORGES D'INFREVILLE, OF NEW YORK, N. Y.

DUPLEX TELEGRAPH.

SPECIFICATION forming part of Letters Patent No. 238,094, dated February 22, 1881.

Application filed December 6, 1880. (No model.)

*To all whom it may concern:*

Be it known that I, GEORGES D'INFREVILLE, a citizen of the Republic of France, and residing in the city, county, and State of New York, have invented certain new and useful Improvements in Duplex Telegraphs, of which the following is a specification.

My invention relates to an improvement in the art or method of and in the apparatus for transmitting two telegraphic signals simultaneously from the opposite ends of one and the same line-wire.

The general object of the invention is to neutralize and prevent the false signal which is ordinarily produced upon the receiving-instrument at the transmitting or home station by what is technically termed the "current of charge."

It is a well-known fact that when an insulated telegraph-line of considerable length having its remote end connected with the earth is suddenly placed in connection with one pole of a battery, whose opposite pole is connected with the earth, a powerful current of electricity of momentary duration flows into the conductor, which is termed the "current of charge." As soon as the conductor has received its full charge a continuous and uniform current is immediately established, which flows from the battery through the full length of the conductor and returns through the earth from the distant station. The longer the line and the greater its resistance the greater is the strength of the current of charge in proportion to that of the permanent current, which traverses the line after it has received its charge. This capacity of the conductor for receiving a charge arises from the effects of induction, the phenomena of which are well understood and need not be enlarged upon in this place.

The conditions requisite for the simultaneous transmission of telegraphic signals in opposite directions are, first, the receiving-instrument at each station must remain at all times in connection with the line; second, the signals transmitted by the key at either end of the line must produce no effect upon the receiving-instrument at the same station. Many different combinations of circuits and apparatus have been devised in which these conditions have been partially fulfilled, but not entirely so. The difficulties which tend to prevent the fulfillment of the latter condition especially arise principally from the effects of the currents of charge and discharge, more particularly the former.

In order to prevent the receiving-instrument at the home station from being affected by the outgoing currents from the home battery, which are designed to produce signals at the distant station, a device commonly known as an "artificial line" is usually employed, which is simply a derived circuit branching from the main line at a point near its junction with the transmitting-key, which goes directly to the earth, or, what is the same thing, returns to the other pole of the home battery. This circuit is provided with artificial resistances or rheostats, by means of which its total resistance may be made equal to that of the main line. This arrangement enables the home receiving-instrument to be placed in a bridge-wire joining the main and artificial lines at points of equal potential, and which point is therefore neutral with reference to outgoing currents, or the receiving-instrument may be provided with two equal and opposing helices, one of which is included in the main and the other in the artificial line. It has, however, been found by experience that although the resistance of the main and artificial lines may be the same, their capacity for receiving a charge may be very different, the main line usually having a great capacity and the artificial line little or none. Thus at the moment of commencing the transmission of a signal the current of charge will flow into the main line; and as this is not compensated by any current of charge flowing into the artificial line a false signal is produced upon the receiving-instrument. The particular object of my invention is to prevent this unequal action, and to bring about a compensation of the effect of the charging-current, whereby the injurious effects of the same upon the home receiving-instrument are altogether done away with.

To this end my invention consists, first, in a method of diminishing the normal resistance of the artificial line simultaneously with the act of charging the main line, whereby the effect of the initial current of charge in the main line may be imitated in the artificial line; second, in reducing the resistance of the artificial line by withdrawing an adjustable rheostat therefrom by the same movement of the transmitter which admits the current of charge to the main line, whereby the strength of the increased current, which is momentarily diverted to the artificial line, may be controlled and regulated; third, in combining a main and an artificial line with a transmitter, which acts to shunt any required portion of the normal resistance constituting the artificial line at the same time that it connects the battery to the main and artificial lines; fourth, in combining with a rheostat normally constituting a portion or the whole of the artificial line a shunt-circuit passing around said rheostat, and a circuit-closer for completing said shunt-circuit, which is attached to or operates simutaneously with the lever of the transmitter.

For the purpose of more clearly explaining my invention, I will briefly refer to the construction and mode of operation of one form of telegraph apparatus for the simultaneous transmission of signals in opposite directions over the same line, commonly known as a "duplex telegraph." I have selected for that purpose the well-known system or method of Maron, in which the receiving-instrument is placed in a bridge-wire, between the main and artificial lines, a method which admits of being conveniently compensated for the disturbing effects of charge and discharge in long lines, and which does not require a specially-constructed receiving-instrument, any ordinary apparatus, whether electro-magnetic or chemical, being equally well adapted thereto. I prefer, however, to make use of a different transmitting apparatus from that devised by Maron, in that alternate, positive, and negative currents are employed, instead of currents exclusively of one polarity; but I may remark that the particular form of transmitting apparatus used constitutes in itself no part of my invention.

Figure 2:
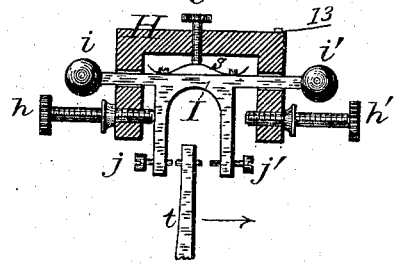

In the accompanying drawings, Figure 1 is a theoretical diagram, illustrating the application of my improved method to a duplex telegraph, and Fig. 2 represents certain details of the apparatus employed in carrying out the invention.

Referring to Fig. 1, T represents a transmitter, consisting of a lever, $t'$, provided at one end with an armature, which is acted upon by an electro-magnet, $m$, a local battery, $e$, and a transmitting-key, K, the arrangement and operation of all which are well understood, and therefore need not be particularly described. Upon the arm $t'$ of the transmitter T are mounted two insulated contact-arms, $n$ $n'$. When the opposite arm of the transmitter is depressed by the action of key K and electro-magnet $m$ the arms $n$ $n'$ are raised and lift the contact-levers N N' from the respective contact-stops $o$ $o'$, upon which they normally rest, thereby simultaneously forming an electric connection between N and $n$, and also between N' and $n'$, and at the same moment breaking the previously-existing connection between N and $o$ and N' and $o'$, the effect of which is to reverse the polarity of the main battery E with reference to the line, as will be understood by tracing the connections. In the normal position of rest, with the key K open, the path of the current is from the earth at G, by way of 1 and 2, to the point $o'$; thence, through the contact-lever N' and wire 3, to the negative pole of the battery E; thence, from the positive pole of the battery by wire 4, contact-lever N, point $o$, and wire 5, to the point 6, where the main and artificial lines separate, the main line going through the rheostat A to the point 7, and thence, by the line-wire L, to the distant station. The artificial line, diverging from the point 6, passes by the rheostat B to the point 8, thence to the point 9 through rheostats C and D to the point 1, where it connects with the earth or the opposite pole of the battery.

It is obvious that if the amount of resistance in the rheostats C and D is made exactly equal to that of the line-wire L leading to the distant station no current will pass through the bridge-wire 7 8, which is connected from the main to the artificial line, and in which is placed the home receiving-instrument R. Moreover, according to the well-known laws of electric action, the result will be the same if the proportion of the rheostat A to the line L is the same as that of the rheostat B to the resistances C and D, taken together in the artificial line.

When the apparatus is at rest, as hereinbefore described, a current of determinate polarity (in this case a positive current) flows continuously to line, and a signal is produced at the distant station by depressing the key K, which operates the transmitter and reverses the polarity of the battery E without breaking its circuit; but at the moment of this reversal the line L, being charged with positive electricity, has a strong affinity for the negative current which succeeds it, and consequently the initial negative charge tends to flow almost wholly toward the line L. This current of charge, not being counterbalanced by a similar current passing through B to the artificial line, tends to produce a false signal upon the receiving-instrument R. In order to obviate this difficulty, I prefer to construct the artificial line in two sections, which sections are composed of separate adjustable rheostats C and D. I provide, also, shunt-wire or short circuit around the rheostat C, which consists of a wire, 13, leading from the point 9, and a wire, 14, leading from the point 10, which wires are connected to a circuit-closing device operated by the transmitter T. The transmitter acts to momentarily close said shunt-circuit at the instant of the reversal of the current in the main and artificial lines, whether from positive to negative or from negative to positive.

It is obvious that inasmuch as the rheostats

C and D, which constitute the artificial line, are made adjustable, any required portion, or even the whole of the resistance of the artificial line, may be temporarily withdrawn in this way, and its total resistance reduced to so small amount that the initial current of the charge will be compensated by the increased current momentarily traversing the artificial line, and thus its interfering effect upon the home relay will be entirely neutralized or compensated.

The device by which the shunt-circuit is closed at the proper time will now be described.

Referring to Fig. 2, H is a metallic frame, which is fixed in a position directly above the upright arm $t$ of the transmitter, as best seen in Fig. 1. Within this frame slides loosely a metallic shuttle, I, upon which rests, with slight pressure, a friction-spring, $s$. The shuttle I is capable of a horizontal movement to and fro within the frame H, which motion is limited in each direction by adjustable screw-stops $h\ h'$. Adjustable contact-points $j\ j'$ are mounted upon two arms projecting downward from the horizontal portion of the shuttle I, and corresponding contact-points are placed upon the upright vibrating arm $t$ of the transmitter T. The contact-points and stops hereinbefore referred to are so adjusted that the play of the shuttle I is somewhat greater than that of the arm $t$ of the transmitter. The effect of this arrangement is that the movement of the arm T in each direction momentarily closes the circuit between itself and the shuttle I, which latter is in electrical connection with the frame H, and consequently with the wire 13. Thus, for example, in Fig. 2, if the arm T moves to the right, in the direction indicated by the arrow, it will strike against the contact-point $j'$ and make electrical contact, after which the shuttle will move along, still in contact with the arm, until the end of its stroke is reached, when the inertia of the shuttle will carry it forward still farther in the same direction, until it brings up against the stop $h'$; but in doing this it will break contact with the transmitter-arm. The same action and the same effect are repeated in connection with the return movement of the arm. It is obvious that by properly adjusting the stops $h\ h'$ and the contact-points $j\ j'$ the duration of the contact can be adjusted within the necessary limits. In order to increase the inertia of the shuttle, I prefer to mount suitable weights, $i\ i'$, upon its extremities.

The galvanometer F, which may be thrown into the circuit of the bridge-wire by withdrawing a metallic plug from the commutator $f$, serves to indicate when the proper balance has been obtained, or, in other words, when the resistance in the rheostat C is sufficient to cause a proper compensation of the current of charge in the artificial line.

I do not desire to confine myself to the particular construction of duplex apparatus which I have shown and described, as many modifications may be employed by which the same results may be effected without departing from the spirit of my invention. For example, two separate batteries of opposite polarities, or even a single one with an ordinary circuit-preserving transmitter, may be employed. In the latter case, however, it would only be necessary to use one-half of the shunt-circuit-closing attachment to the transmitter, which is represented in Fig. 2 of the drawings.

I claim as my invention—

1. The method, substantially as hereinbefore set forth, of counterbalancing the effects of the current of charge in a duplex-telegraph system, which consists in momentarily diminishing the normal resistance in the artificial line simultaneously with the act of charging the main line.

2. The method, substantially as hereinbefore set forth, of counterbalancing the effects of the current of charge in a duplex-telegraph system, which consists in withdrawing an adjustable rheostat from the artificial line by the same movement of the transmitter which admits the current of charge to the main line.

3. The combination, substantially as hereinbefore set forth, of a main line, an artificial line, and a key or transmitter provided with two sets of circuit-closers arranged to act simultaneously, one to connect the battery with the main and artificial lines, and the other to shunt a portion of the resistance in the artificial line.

4. The combination, substantially as hereinbefore set forth, of a rheostat normally constituting a portion of the artificial line, a shunt-circuit passing around said rheostat, and a circuit-closer for completing said shunt-circuit, which is attached to or operated simultaneously with the lever of the transmitter.

5. The combination, substantially as hereinbefore set forth, of the transmitter-arm, the reciprocating weighted shuttle, moving with slight friction between adjustable stops, and by its inertia having a greater range of vibration than the transmitter-arm, and the contact-points upon the said shuttle facing the transmitter-arm.

In testimony whereof I have hereunto subscribed my name this 3d day of December, A. D. 1880.

GEORGES D'INFREVILLE.

Witnesses:
NELSON ZABRISKIE,
MILLER C. EARL.